UNITED STATES PATENT OFFICE.

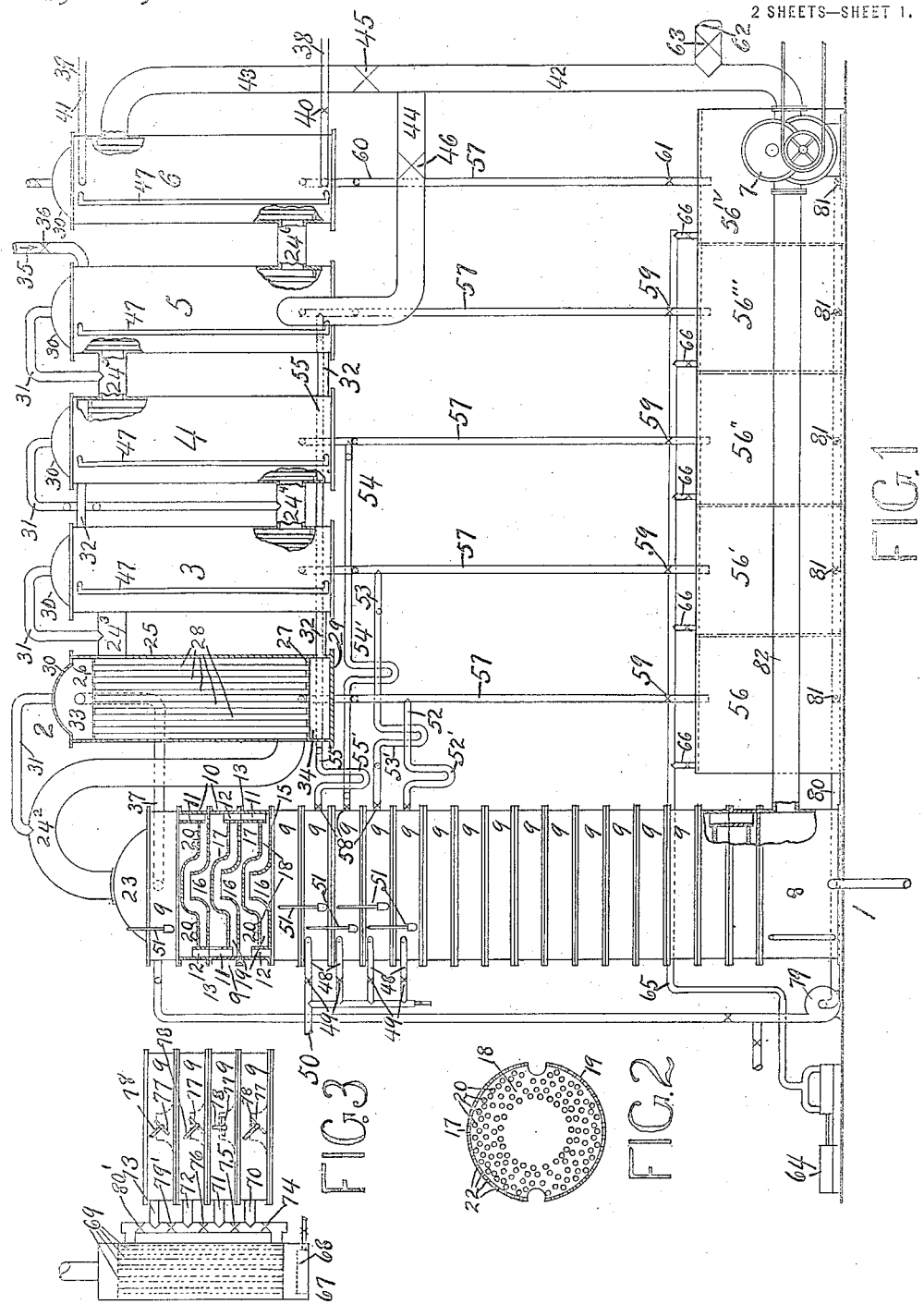

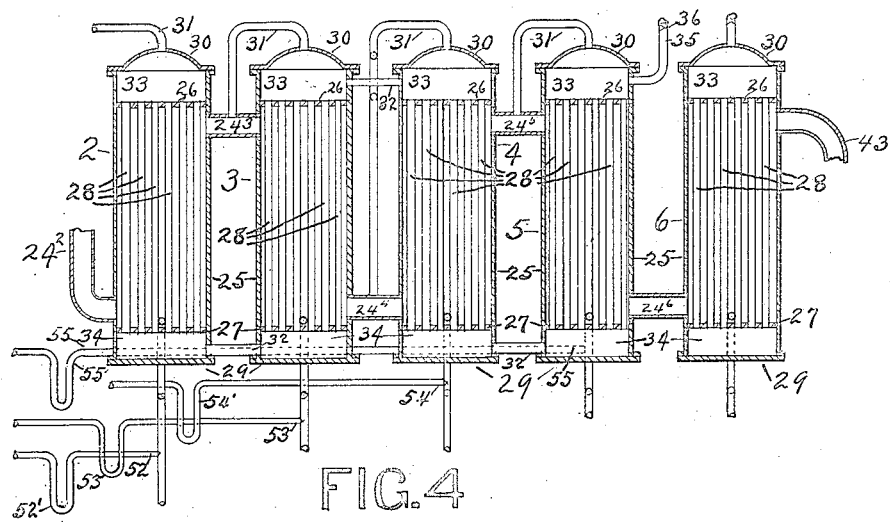

HENRY L. DOHERTY, OF NEW YORK, N. Y.

DISTILLATION PROCESS.

1,225,226. Specification of Letters Patent. Patented May 8, 1917.

Application filed July 16, 1912. Serial No. 709,796.

*To all whom it may concern:*

Be it known that I, HENRY L. DOHERTY, a citizen of the United States, and a resident of New York city, in the county of New York and State of New York, have invented certain new and useful Improvements in Distillation Processes, of which the following is a specification.

This invention relates to distillation processes, and in particular to that kind of such processes in which the heating of the liquid to be distilled is performed through the medium of air or other gas which itself receives the heat in the first instance and subsequently gives it up to the liquid to be distilled.

The object of my process is to increase the heat economy in distillation processes by recovering and transferring to the liquid flowing to the still the heat of the liquid and gaseous effluents from the still.

I am aware that the use of hot air or other gas to heat the liquid flowing to the still is old in the art and I do not claim this method broadly. What my method comprises, briefly stated, is, among other features, the circulation of the gaseous heating medium through the distilling apparatus in a closed circuit, during a considerable portion of which, at any rate, the heating medium is in contact with the liquid undergoing distillation, and the introduction of the necessary heat into the medium at a mid-point of its circulation in contact with the liquid, whereby the influent liquid is subjected to gradual heating to the maximum temperature by the heating medium, at the same time cooling the latter, and then to gradual cooling by the heating medium which has been cooled by the influent liquid. In this manner, with a proper adjustment of the proportions of liquid and heating medium, the heat of the still effluents can be recuperated with practical completeness.

In the accompanying diagrammatic drawings, I have shown an arrangement of apparatus capable of carrying out my process. In the drawings, Figure 1 shows a diagrammatic side elevation of my apparatus with a portion of the still or dephlegmator and one of the condensing vessels shown in vertical section. Fig. 2 is a bottom view of one of the hoods 17. Fig. 3 is a diagrammatic illustration of a modification of the apparatus used when the circulating heat carrying medium is heated by a dry heater instead of by steam. Fig. 4 is a vertical longitudinal section through the respective condensers.

1 is the dephlegmator or still proper. 2, 3, 4 and 5 are recuperative condensers, in which condensable vapors carried by the current of circulating gas are condensed by the stream of initially cool material flowing to the still 1. 6 is an auxiliary refrigerating condenser in which such vapors as boil at temperatures below the ordinary atmospheric temperatures may be condensed. 7 is a blower for circulating the current of air or other gaseous medium used as the heat carrier.

The still proper or dephlegmator 1, comprises a sump chamber 8, and a plurality of contact chambers 9. These latter each comprise a double-flanged cylinder 10 having two vertically alined tube sets 11 and 12. The tube 11 is preferably arranged so that its upper orifice is flush with the surface of the upper flange 13 and its lower termination just above the bottom 15 of the chamber. The tube 12 has its lower orifice extending through and flush with the lower surface of the bottom 15 and its upper extremity terminating at the level at which it is desired to maintain the liquid in the chamber. The tubes 11 and 12 are located out of line with each other and preferably at points diametrically opposite each other. In assembling the still, the adjacent sections are assembled so that the tube 11 of the middle section of any group of three sections registers with the tube 12 of the uppermost section and the tube 12 of the middle section registers with the tube 11 of the lowermost section. By this arrangement, liquid overflowing through the tube 12 of any section is delivered into the next section below near the bottom thereof and below the level of the liquid therein, thus permitting free overflow of liquid from section to section without the possibility of the "short-circuiting" of gas from chamber to chamber through the overflow passages.

The bottoms 15 of the chambers 9 have each an axial upwardly projecting tubulature 16, which has preferably a truncated-conical or nozzle shape. The upper orifice of the tubulature 16 of each chamber terminates at a sufficient height above the overflow passage 12 to avoid overflow of liquid through 16. A hood 17, having a flange-portion 18, and a vertical web 19, is set over the tubulature 16. The flange portion 18 of hood 17 is provided with numerous apertures 20. The diameter of the flange 18 is such that the hood will fit loosely within the wall of the chamber while the height of the web 19 is such that, while the flange 18 will be below the overflow level, it will still be sufficiently above the lower termination of the tube 11 to insure of the maintenance of a sufficient depth of liquid on the bottom 15 to seal the lower termination of the tube 11. By this arrangement, the gaseous current from the lower of two adjacent sections enters the upper through the tubulature 16 under the hood 17. It then spreads out under the flange 18 displacing liquid and passing through the apertures 20, bubbles up through the liquid above the flange. The agitation set up by the passage of the gas establishes a rapid circulation of the liquid so that the whole body of the latter is exposed to contact with the gaseous stream while the latter only has to overcome the head of liquid above the flange 18 to find passage through it. To facilitate the circulation the lower edge of the web 19 is preferably serrated or notched so that the liquid finds ready passage downward between the web 19 and the cylindrical wall of the chamber and the serrations 22 of 19 and thence upward with the gas through the apertures 20.

The uppermost of the contact chambers 9, has a dome-shaped cover 23, from which leads the vapor-pipe $24^2$, which connects preferably with the intertubular space of the first surface condenser 2. This vessel 2, as well as the other condensers, is of the well-known tubular heater type and in the construction shown has a cylindrical wall 25, interior upper and lower tube-sheets 26 and 27, respectively, a plurality of tubes 28, bottom-plate 29 and dome 30. The dome 30 of each vessel has a pipe 31 connecting it with the vapor inlet pipe, designated by the number 24 with the numeral designating the vessel as superscript. Connections 32 as shown, establish communication between alternately the chambers 33 and 34 of adjacent vessels. A pipe 35, provided with a valve 36, supplies the liquid to be distilled to the tubular space of the vessel 5. A pipe 55 connects the tubular space of vessel 5 with one of the contact chambers 9 of the still 1, while a branch 57 of 55 connects the vessel with the reservoir $56'''$. Valves 58 and 59 on 55 and 57 respectively, control the flow through the respective pipes. On opening valve 36 therefore, the liquid or mash which is to be subjected to distillation fills the tubular space of the several condensers, then flows through the connection 37 into the uppermost of contact chambers 9 of still 1.

The refrigerating condenser 6 may be a vessel of the same type as the condensers 2, 3, etc., or of any type preferred. Connections 38 and 39, having valves 40 and 41, respectively, to the tubular space of 6 permit of the circulation through it of the proper cooling medium to reduce the temperature of the gaseous current from condenser 5 to the proper degree. A pipe 60, having valve 61, conducts condensed liquid from the intertubular space of 6 to tank $56'^v$. The suction pipe 42 of blower 7 has branches 43 and 44, leading respectively to the intertubular space of vessels 6 and 5. Valves 45 and 46 on 43 and 44, respectively, permit of the shifting of the suction of blower 7 to either one of the vessels 5 or 6, as may be desired. Another branch 62 of 42, having a valve 63, permits of the introduction into the system of any gaseous heat-carrying medium desired.

The method of operating the apparatus to carry out my process is as follows:

By opening valve 36, the mash, or whatever other liquid is to be subjected to distillation, is fed through the pipe 35 into the chamber above the tubes of the first condenser 5. With the connections 32 shown the liquid flows from 5 to 4 and fills the two vessels to the level of the overflow connection 32 of 4, thence flows to the vessels 3 and 2 and fills these. Gages 47 are provided for determining the height of the liquid in the vessels.

The blower 7 is now started and drawing air or any other gaseous medium best adapted to the operation to be performed through the still and intertubular space of the condensers returns it to the lower chamber 8 of the still through the pipe 82, thus establishing a closed gaseous circulation through the apparatus. Steam is now turned on from one of the steam connections 48 by opening the valve 49 on that connection. Steam now flows through the pipe 50, and the particular one of the connections 48 which has been opened, into that one of the contact chambers into which that particular connection opens. The steam mingles with and heats the gaseous current passing through the apparatus and the contact chambers themselves. When the thermometer 51 of the uppermost contact chamber indicates that the proper temperature has been reached, the valve 36 is again partially opened and the mash or other liquid flows from 2 through the pipe 37 into the uppermost of contact chambers 9. The liquid, which has meanwhile been subjected to a preliminary heating in the condensers by heat transmitted to it through the walls of the tubes 28 from the current of mixed gas and steam passing to the intertubular space of vessel 2, is now subjected to direct contact with the current of mixed steam and gaseous fluid passing upward through the still. The hot gaseous stream bubbling through the mash or other liquid facilitates the expulsion therefrom of the volatile liquids and dissolved gases therein, which are taken up by the gaseous stream and carried into the intertubular space of 2. At the same time any vapors generated or gases liberated from the liquid in the tubular space of 2 by the heating which it undergoes therein pass through the pipe 31 and join the main stream of gaseous fluid passing to the intertubular space of 2, or of any particular vessel preferred.

In the intertubular space of 2, this gaseous stream gives up a portion of its heat to the liquid in the tubular space and, in consequence, a portion of the vapors, whose liquids have the higher boiling points, are condensed. This condensation, when working the apparatus as an intermittent still, is usually returned to the still 1 through the pipe 52, which has a " goose-neck " 52′ of sufficient depth to seal it against any short-circuiting of the gases from 1 to 2. The partially cooled gaseous current then passes through the connection 24³ to the intertubular space of condenser 3, where it parts with more of its initial heat to the liquid flowing through the tubular space of 3 and suffers still further condensation of its condensable vapors—those condensing whose boiling points lie between the temperatures prevailing in 2 and 3. The condensed liquid, as in the case of 2, is led from the intertubular space of 3 back to the still 1 at the preferred level therein, through a pipe 53 having a seal 53′. A further cooling and condensation occurs successively in 4 and 5, the gaseous current being brought down in 5 to nearly the temperature at which the liquid to be distilled enters 5. The distillate condensed in 4 is usually returned to the still through a pipe 54 having a seal 54′. Whatever distillate it is desired to recover, however, is conducted to the corresponding one of the tanks 56, 56′, etc., through one of the branch pipes 57. When it is necessary to cool the gaseous current to a still lower temperature to remove the last portion of the vapors which it is desired to recover, they are passed to the refrigerating condenser 6 through the connection 24⁵. Here they are subjected to the final cooling by a liquid having a suitable temperature to reduce the temperature of the gaseous current to the desired degree.

The distillate which it is desired to recover is usually taken from either the vessels 5 or 6 and the other distillates condensed in the other chambers when using the apparatus for continuous distillation, run to separate storage tanks 56, 56′, 56″, 56‴, 56ⁱᵛ, for such other subsequent treatment as may be desired, after the usual fashion of carrying out continuous distillation. When working intermittently, as described above, the desired distillate is usually removed from the system through the appropriate one of the pipes 57 and collected in the corresponding one of tanks 56, the other distillates being returned through the pipes 52, 53, 54, etc., according to the distillate recovered. When working under a partial vacuum in the apparatus, the tank or tanks which is or are to receive the distillates withdrawn from the distilling system is or are previously exhausted by the air pump 64 through the pipe 65, and valved connections 66.

When desired, any of distillates collected in tanks 56, 56′, 56″, etc., may be returned to the dephlegmator by the pump 79, which is connected with the several tanks by the pipe 80, having a valved connection 81 to each tank.

The handling of the distillates, however, is not a matter with which my invention is specifically concerned. As previously stated, my invention is concerned, primarily, with the method of heating and heat recuperation employed. This is as follows: Normal operating conditions having once been established, the relatively cool liquid is entering the system through the pipe 35 and flowing through the condensers in series, in which it is receiving heat from the hot gaseous current passing through the condensers in the reverse order, the heat yielded up by the gaseous current existing therein in part as sensible heat and in part as latent heat in the vapors carried by the said current. As these vapors are condensed, the heat liberated is taken up by the in-flowing stream of liquid raising its temperature. The liquid is thus subjected to more or less distillation of its volatile bodies before it reaches the dephlegmator 1. The vapors thus generated from the entering liquid pass off through the pipes 31 and join the main gaseous current flowing in the opposite direction through the condensers, to be condensed again in that condenser having the appropriate temperature. The liquid thus reaches the uppermost of the contact chambers 9 of dephlegmator 1 in a preheated state. Passing downward from chamber to chamber through the sealed overflow passages 12—11 the liquid is brought into direct contact with the hot gaseous current ascending through the dephlegmator, and that portion of the liquid which is volatile under the conditions obtaining is liberated from the liquid and taken up by the gaseous current. As the liquid approaches that one of the contact chambers in which the circulating gaseous medium receives heat from without the system, its temperature is gradually increased, reaching a maximum in the particular chamber located next above the chamber into which the extraneous heat is introduced. Here the last portions of the vapors volatile under the conditions obtaining are driven off from the liquid. Passing from the heating chamber to the chambers below the hot liquid freed from its volatile ingredients is subjected to a progressive cooling by the ascending stream of gaseous heat-carrying medium. This is drawn off from the last of the condensers and may therefore be at a lower temperature than even the initial temperature of the liquid flowing to the dephlegmator 1. Bubbling up through the descending liquid in the lower sections 9, the initially cool current of air or gas is heated while the initially hot waste liquid is cooled. When the relative volumes of gas in circulation and liquid under treatment are so adjusted that they have about equal heat-carrying capacities per degree, the liquid will be discharged into the sump chamber 8 at very near the temperature at which the gas enters 8, while the gaseous current will reach that one of the chambers 9 into which heat is introduced from an extraneous source at nearly the temperature at which the liquid leaves it. Owing, however, to the fact that the increasing temperature increases the vapor-carrying capacity of the gas, when the liquid has an appreciable vapor tension, more or less evaporation of the liquid takes place. The heat thus rendered latent acts to lower the temperature of the liquid below that due to the normal cooling by the gas, so that, in this case, the gas will not reach the heating-chamber at as high a temperature as it otherwise would.

Owing to the heat unavoidably withdrawn from the system by losses to the atmosphere, in the latent and sensible heat of the condensed distillates withdrawn and the heat taken out in the refrigerator (when this is used) it is always necessary to continually introduce more or less heat into the system. This, as before mentioned, I accomplish, preferably, by the introduction of steam into the gaseous heat-carrying medium. If preferred, however, the heating of the gas may be carried out in an ordinary heater heated in any way preferred through which the gaseous current is passed immediately before it reaches the maximum-temperature chamber. This modification may be carried out by introducing a coil chamber into the dephlegmator column just below the maximum-temperature chamber. Since the desirable location of this chamber in the dephlegmator column may vary, however, with the conditions of working, it is preferable to locate any such extraneous heating chamber without the dephlegmator column and put in suitable connections so that the circulating gas may be withdrawn from any one of several contact chambers and returned to the one above that from which it was withdrawn. A modification of the apparatus capable of carrying out such modification of the heating is shown diagrammatically in Fig. 3. In this, 67 represents a gas-heater having a burner 68. The hot combustion gases ascend through the flues 69, while the circulating heat-carrying medium passes through the space around the tubes. It is drawn off from the desired one of the chambers 9 through one of the connections 70, 71 or 72, and returns through one of the connections 71, 72 or 73 which is located above the one serving as the off-take. Valves 74, 75, 76, 79' and 80' permit of the regulation of the place of withdrawal and return of the heat-carrying medium. Dampers 77, operated by stems 78, in the passages 16 of the chambers 9 involved, are in this case provided for shutting off direct flow of gas from the chamber from which it is desired to withdraw the gas to the chamber above.

As the gaseous heat-carrying medium ascends through the dephlegmator column above the maximum-temperature chamber it is subjected to gradual cooling by the descending liquid which is, on the other hand, of course, subjected to heating as explained above. The intimacy of contact secured between gas and liquid is such that, when the thermal capacities of the two currents are properly balanced, the two may be maintained at approximately the same temperature in each of the chambers 9. By my invention, therefore, I am able to recover and restore to the system practically all of the heat which the effluent liquid from the still contains above the initial temperature of the liquid flowing to the still. In fact, when refrigeration is used, the effluent liquid is made to yield up heat even below this temperature. With balanced currents, the effluent liquid may, as stated, be cooled to approximately the temperature of the refrigerator 6 (neglecting the heat increment which the gas receives between 6 and 8). The sensible heat taken from the circulating gas in 6 is thus largely restored to the system by the effluent liquid from the dephlegmator, and the refrigerator practically only robs the system of that portion of the heat which is accounted for by the distillate withdrawn from 6. The heat required for carrying out the distillation of a liquid bearing volatile constituents, is thus reduced to a minimum.

My invention may be applied not only to ordinary distillations, such as the distillation of alcohol bearing "mashes" and the fractional distillation of oils, but also to chemical operations such as the manufacture of acetic acid from dilute alcohol. In this particular case, oxygen is substituted for air as the heat carrying medium. In a similar manner the treatment of liquids by gases, generally at moderately high temperatures, may be carried out with a very high degree of economy.

While in the preferred and, in most cases, most advantageous embodiment of my invention I bring the heat-carrying medium and the liquid that is to undergo distillation into actual contact during at least a portion of the operation, it is to be understood that I do not limit myself to such specific embodiment of my invention, since it is obvious that the heat-recuperation process which is the primary feature of my invention could be carried out without actual contact of the liquid and gas. This could be done, for instance, by using a sufficient train of vessels such as the condensers shown. Since, however, the transfer of heat from one medium to the other is much slower in this case than where the two are in contact, and the distilling operation is much facilitated by the contact of gas and liquid, the embodiment illustrated and specifically described is usually the most advantageous.

Having described my invention, what I claim is,

1. The method of distilling volatile ingredients from liquid bodies which comprises the counter-current contacting of a liquid carrying volatile ingredients with a gaseous heat-carrying medium and the introduction of heat into said gaseous medium at a locality intermediate between the locality at which the said liquid makes contact and the locality at which the said liquid breaks contact with said heat-carrying medium.

2. The method of distilling volatile ingredients from liquid bodies which comprises heating a body of liquid to the temperature of distillation by counter-current contact with a gaseous heat-carrying medium having an initial temperature above the temperature of distillation, whereby said body of liquid is heated and volatile ingredients are distilled from said body of liquid and the said gaseous medium is cooled, and establishing heat transferring relationship between the relatively cool heat-carrying medium and the relatively hot residual liquid from which the desired volatile ingredients have been distilled, whereby the said heat-carrying medium is reheated and the said residual liquid cooled.

3. The method of distilling volatile ingredients from liquid bodies which comprises heating a body of liquid to the temperature of distillation by counter-current contact with a gaseous heat-carrying medium having an initial temperature above the temperature of distillation, whereby said liquid is heated and volatile ingredients are driven off from said body of liquid and the said gaseous medium is cooled, and bringing the relatively cool heat-carrying medium into counter-current contact with the relatively hot residual liquid from which the desired volatile ingredients have been distilled, whereby said heat-carrying medium is reheated and the said residual liquid cooled.

4. The method of distilling volatile ingredients from bodies of liquid which comprises maintaining a closed circulation of a gaseous medium, introducing heat into said medium at some locality in the circulation, bringing a body of liquid into heat transferring relationship with said heat-carrying medium beyond the place of introduction of heat into the same, whereby said liquid is heated, volatile ingredients driven off from said liquid and the said heat-carrying medium cooled, and bringing the heated residual liquid from which the desired volatile ingredients have been distilled into heat-transferring relationship with the cooled heat-carrying medium, whereby the said medium is reheated by the heat of said residual liquid and the said residual liquid cooled.

5. The method of distilling volatile ingredients from bodies of liquid which comprises maintaining a closed circulation of a gaseous medium, introducing heat into the heat-carrying medium at some locality in the circulation, bringing a body of preheated liquid into heat-transferring relationship with the heated gaseous medium, whereby the volatile ingredients of said liquid are vaporized and taken up by the said gaseous medium, bringing the vapor-laden gaseous medium into heat-transferring relationship with the initially cool liquid, whereby vapor is condensed out of said gaseous medium and latent heat of the condensed vapor and sensible heat of the gaseous medium are transferred to the initially cool liquid to preheat the same and the said gaseous medium is cooled, and bringing the heated residual liquid into heat-transferring relationship with the cooled gaseous medium, to reheat said medium and to cool said residual liquid.

6. The method of distilling volatile ingredients from bodies of liquid which comprises maintaining a closed circulation of a gaseous heat-carrying medium, introducing heat into said medium at some locality in the circulation, contacting liquid containing volatile ingredients with the gaseous medium after the same has been heated, whereby volatile ingredients of said liquid are vaporized and taken up by said medium, cooling the vapor-laden gaseous medium to condense vapors therefrom, and contacting the cooled gaseous medium with the residual liquid from which volatile ingredients have been vaporized, whereby the said medium is reheated by the heat of said residual liquid and the said residual liquid is cooled.

7. The process of distilling volatile ingredients from bodies of liquid which comprises maintaining a closed circulation of a gaseous medium, introducing heat into the said gaseous medium at some locality in the circulation, contacting preheated liquid containing volatile ingredients with the heated gaseous medium, whereby volatile ingredients of said liquid are vaporized and taken up by said gaseous medium, bringing the vapor-laden gaseous medium into heat-transferring relationship with the initially cool liquid, whereby vapor is condensed out of said gaseous medium and latent heat of the condensed vapor and sensible heat of the gaseous medium are transferred to the initially cool liquid to preheat the same and the said gaseous medium is cooled, and bringing the heated residual liquid into heat-transferring relationship with the cooled gaseous medium to reheat said medium and to cool said residual liquid.

8. The process of distilling volatile ingredients from bodies of liquid which comprises maintaining a closed circulation of a gaseous medium, introducing heat into the said gaseous medium at some locality in the circulation, contacting preheated liquid containing volatile ingredients with the heated gaseous medium, whereby volatile ingredients of said liquid are vaporized and the vapors taken up by said gaseous medium, bringing the vapor-laden gaseous medium into heat-transferring relationship with the initially cool liquid, whereby vapor is condensed out of said gaseous medium and latent heat of the condensed vapor and sensible heat of the gaseous medium are transferred to the initially cool liquid to preheat the same and the said gaseous medium is cooled, and contacting the heated residual liquid from the vaporizing operation with the cooled gaseous medium to reheat the said medium and to cool said residual liquid.

9. The process of distilling volatile ingredients from bodies of liquid which comprises maintaining a closed circulation of a gaseous medium, injecting steam into said gaseous medium at some point in the circulation, bringing a body of liquid containing volatile ingredients into heat-transferring relationship with the said gaseous medium after the injection of steam into said medium, whereby the said liquid is heated, volatile ingredients vaporized and driven off from said liquid and the said gaseous medium cooled, and bringing residual liquid from said vaporizing operation into heat-transferring relationship with the cooled gaseous medium to reheat said medium and to cool said residual liquid.

10. The process of distilling volatile ingredients from bodies of liquid which comprises maintaining a closed circulation of a gaseous medium, injecting steam into the said gaseous medium at some point in the circulation, bringing a body of preheated liquid into heat-transferring relationship with the gaseous medium after the introduction of steam thereinto, whereby volatile ingredients of said liquid are vaporized and taken up by the said gaseous medium, bringing the vapor-laden gaseous medium into heat-transferring relationship with the initially cool liquid, whereby vapor is condensed out of said gaseous medium and latent heat of the condensed vapor and sensible heat of the gaseous medium are transferred to the initially cool liquid to preheat the same and the said gaseous medium is cooled, and bringing the heated residual liquid into heat-transferring relationship with the cooled gaseous medium to reheat the said medium and to cool said residual liquid.

11. The process of distilling volatile ingredients from bodies of liquid which comprises maintaining a closed circulation of a gaseous heat-carrying medium, injecting steam into said medium at some locality in the circulation, contacting liquid containing volatile ingredients with the gaseous medium after the injection of steam thereinto, whereby volatile ingredients of said liquid are vaporized and taken up by said medium, cooling the vapor-laden gaseous medium to condense vapors therefrom, and contacting the cooled gaseous medium with the residual liquid from which volatile ingredients have been vaporized, whereby the said medium is reheated by the heat of said residual liquid and the said residual liquid cooled.

12. The process of distilling volatile ingredients from bodies of liquid which comprises maintaining a closed circulation of a gaseous medium, injecting steam into the said gaseous medium at some point in the circulation, contacting preheated liquid containing volatile ingredients with the gaseous medium after the said introduction of steam thereinto, whereby volatile ingredients of said liquid are vaporized and taken up by said gaseous medium, bringing the vapor-laden gaseous medium into heat-transferring relationship with the initially cool liquid, whereby vapor is condensed out of said gaseous medium and latent heat of the condensed vapor and sensible heat of the gaseous medium are transferred to the initially cool liquid to preheat the same and the said gaseous medium is cooled, and bringing the heated residual liquid into heat-transferring relationship with the cooled gaseous medium to reheat said medium and to cool said residual liquid.

13. The process of distilling volatile ingredients from bodies of liquid which comprises maintaining a closed circulation of a gaseous medium, injecting steam into the said gaseous medium at some locality in the circulation to heat the same, contacting preheated liquid containing volatile ingredients with the heated gaseous medium, whereby volatile ingredients of said liquid are vaporized and the vapors taken up by said gaseous medium, bringing the vapor-laden gaseous medium into heat-transferring relationship with the initially cool liquid, whereby vapor is condensed out of said gaseous medium and latent heat of the condensed vapor and sensible heat of the gaseous medium are transferred to the initially cool liquid to preheat the same and the said gaseous medium is cooled, and contacting the heated residual liquid from the vaporizing operation with the cooled gaseous medium to reheat the said medium and to cool the said residual liquid.

14. The process of distilling volatile ingredients from liquids which comprises transferring heat from hot liquid which has undergone distillation to liquid to be distilled through the medium of a gaseous heat-carrier, raising the so-heated liquid to be distilled to the maximum temperature desired in the distillation by contacting said heated liquid with steam, and transferring heat from the vapors produced in the distillation to a fresh body of liquid to be distilled.

15. The process of distilling volatile ingredients from liquids which comprises establishing a flow of liquid to and through a hot or distilling zone, passing a gaseous heat carrier in contact with the hot liquid flowing from said zone and thence passing it to said zone, introducing steam into said zone, withdrawing from said zone a mixture of vapors and said carrier, transferring heat from said mixture to liquid flowing to said zone, whereby vapors are condensed from said mixture and returning the residual carrier for renewed contact.

16. The process of distilling volatile ingredients from liquids which comprises establishing a flow of liquid to and through a hot or distilling zone, passing a gaseous heat carrier in contact with the hot liquid flowing from said zone and thence passing it to said zone, introducing steam into said zone, producing a plurality of contacts of the mixture of carrier, steam and vapors with said liquid flowing through said zone, withdrawing from said zone a mixture of vapors and said carrier, transferring heat from said mixture to liquid flowing to said zone, whereby vapors are condensed from said mixture and returning the residual carrier for renewed contact.

17. The process of distilling volatile ingredients from liquids which comprises maintaining a closed circulation of a gaseous medium, introducing heat into said medium at some locality in the circulation, subjecting liquid to be distilled to a plurality of contacts with said gaseous medium after the said introduction of heat into the same, whereby said liquid is heated, volatile ingredients driven off from said liquid, and the said gaseous medium partially cooled, and bringing the heated residual liquid into heat-transferring relationship with the cooled gaseous medium, whereby the said medium is reheated by the heat of said residual liquid and the said residual liquid cooled.

18. The process of distilling volatile ingredients from liquids which comprises, maintaining a closed circulation of a gaseous medium, introducing heat into said medium at some locality in the path traversed by the same, subjecting preheated liquid to be distilled to a plurality of contacts with the heated gaseous medium, whereby volatile ingredients of said liquid are vaporized and taken into admixture with the said gaseous medium, bringing the vapor-laden gaseous medium into heat-transferring relationship with the initially cool liquid to be distilled, whereby vapor is condensed out of said gaseous medium, said liquid is preheated and the said gaseous medium is cooled, and bringing the heated residual liquid into heat-transferring relationship with the cooled gaseous medium to reheat said medium and to cool said residual liquid.

19. The process of distilling volatile ingredients from bodies of liquid which comprises maintaining a closed circulation of a gaseous medium, introducing sufficient heat into the preheated gaseous medium to raise the same to the maximum temperature desired in the distillation, subjecting liquid to be distilled to a plurality of contacts with the so-heated gaseous medium, whereby volatile ingredients of said liquid are vaporized and taken into admixture with said gaseous medium, cooling the admixture of vapors and gaseous medium to condense vapors therefrom, and subjecting residual liquid from which volatile ingredients have been vaporized to a plurality of contacts with said cooled gaseous medium, whereby the said medium is preheated by the heat of said residual liquid and said residual liquid cooled.

20. The process of distilling volatile ingredients from liquids which comprises, maintaining a closed circulation of a gaseous medium, introducing sufficient heat into the preheated gaseous medium to raise its temperature to at least the maximum temperature desired in the distillation, subjecting the preheated liquid to be distilled to a plurality of contacts in counter-current relationship with the so-heated gaseous medium, whereby volatile ingredients of said liquid are vaporized and taken into admixture with said gaseous medium, bringing the admixture of vapors and gaseous medium into heat-transferring relationship with the initially cool liquid to be distilled, whereby vapors of said admixture are condensed, the said liquid preheated, and the said gaseous medium cooled, and bringing the heated residual liquid from which volatile ingredients have been vaporized into heat-transferring relationship with the cooled gaseous medium to preheat the said medium and to cool said residual liquid.

21. The process of distilling volatile ingredients from bodies of liquid which comprises maintaining a closed circulation of a gaseous medium, heating the preheated gaseous medium to the maximum temperature desired in the distillation by injecting steam into said gaseous medium, subjecting a body of preheated liquid to be distilled to a plurality of contacts in counter-current relationship with the so-heated gaseous medium, whereby volatile ingredients are vaporized from said liquid and taken into admixture with said gaseous medium, subjecting said admixture to cooling to separate vapors therefrom and to cool said gaseous medium, and subjecting residual liquid from which volatile ingredients have been vaporized to a plurality of contacts with the cooled gaseous medium, whereby said medium is preheated and the said residual liquid is cooled.

22. The process of distilling volatile ingredients from liquids, which comprises, continuously maintaining a regulated volume of a gaseous medium in movement through a closed circuit, injecting sufficient steam into the preheated gaseous medium to raise the temperature of the same to the maximum temperature desired in the distillation, subjecting liquid to be distilled to a plurality of contacts in counter-current relationship with the so-heated gaseous medium, whereby volatile ingredients are vaporized from said liquid and taken into admixture with said gaseous medium, bringing the said admixture into heat-transferring relationship with the initially cool liquid to be distilled, whereby vapors are condensed out of said gaseous medium and latent heat of the condensed vapors and sensible heat of the mixture are transferred to the said liquid to preheat the same and to cool said gaseous medium, and bringing the cooled gaseous medium into heat-transferring relationship with residual liquid from which volatile ingredients have been distilled, whereby said gaseous medium is preheated and said residual liquid is cooled.

23. The method of distilling volatile constituents from liquids which comprises, maintaining a regulated volume of gaseous medium in continuous circulation through a closed conduit, introducing sufficient heat into the preheated gaseous medium to raise the temperature of the same to the maximum temperature desired in the distillation, bringing preheated liquid to be distilled into heat-transferring relationship with the so-heated gaseous medium, whereby volatile ingredients are distilled from said liquid and the vapors of the same admixed with said gaseous medium, bringing the said mixture of vapors and gaseous medium into heat-transferring relationship with liquid to be distilled to preheat said liquid, to condense vapors from said admixture, and to cool the residual gases of said admixture, subjecting said residual gases to refrigeration to condense residual vapors and to refrigerate said gaseous medium, bringing the refrigerated gaseous medium into heat-transferring relationship with residual liquid from which volatile ingredients have been vaporized to cool said liquid and to preheat said gaseous medium.

Signed at New York city in the county of New York and State of New York this 13th day of July A. D. 1912.

HENRY L. DOHERTY.

Witnesses:
  F. G. SOUTHWORTH,
  WILLIAM A. DUGEF